(12) United States Patent
Matsumoto

(10) Patent No.: US 7,873,197 B2
(45) Date of Patent: Jan. 18, 2011

(54) CHANGING THE DISPLAY ANGLE OF VISUALIZED TUBULAR TISSUE

(75) Inventor: Kazuhiko Matsumoto, Tokyo (JP)

(73) Assignee: Ziosoft, Inc., Tokyo (JP)

( * ) Notice: Subject to any disclaimer, the term of this patent is extended or adjusted under 35 U.S.C. 154(b) by 0 days.

(21) Appl. No.: 12/500,290

(22) Filed: Jul. 9, 2009

(65) Prior Publication Data
US 2010/0008557 A1    Jan. 14, 2010

(30) Foreign Application Priority Data
Jul. 14, 2008    (JP)    ............................ 2008-182939

(51) Int. Cl.
*G06K 9/00*    (2006.01)
(52) U.S. Cl. ....................... 382/131; 382/100; 382/128; 382/132
(58) Field of Classification Search ................. 382/100, 382/128, 131, 132
See application file for complete search history.

(56) References Cited

U.S. PATENT DOCUMENTS

| 7,693,563 | B2* | 4/2010 | Suresh et al. | ............... 600/407 |
| 7,742,629 | B2* | 6/2010 | Zarkh et al. | ............... 382/128 |
| 2004/0220466 | A1 | 11/2004 | Matsumoto | |
| 2006/0280347 | A1* | 12/2006 | Shirahata et al. | ............ 382/128 |
| 2008/0137926 | A1* | 6/2008 | Skinner et al. | ............... 382/131 |
| 2008/0205727 | A1* | 8/2008 | Bontus et al. | ................ 382/131 |

FOREIGN PATENT DOCUMENTS

JP    2002-092590 A    3/2002

OTHER PUBLICATIONS

Kanitsar et al; "CPR-Curved Planar Reformation". Institute of Computer Graphics and Algorithms, Vienna Universtiy of Technology, 2002.
Concise Statement of Japanese Office action dated Apr. 1, 2010.

* cited by examiner

*Primary Examiner*—Bhavesh M Mehta
*Assistant Examiner*—Stephen R Koziol
(74) *Attorney, Agent, or Firm*—Pearne & Gordon LLP

(57) ABSTRACT

An image processing apparatus includes: a center line determination section which determines a center line of a tubular tissue based on volume data; a direction vector determination section which determines a direction vector; a curved surface determination section which determines a curved surface formed by a set of plural lines, each of the plural lines passing through a certain point on the center line and being parallel with the direction vector; a visualizing section which visualizes the tubular tissue based on the volume data on the curved surface; and a tangent vector determination section which determines a tangent vector of the center line at an attention point on the center line. The direction vector determination section rotates the direction vector such that an angle formed between the direction vector and the tangent vector is maintained, and the rotated direction vector will be a new curved surface.

6 Claims, 15 Drawing Sheets

CHANGING THE DISPLAY ANGLE OF VISUALIZED TUBULAR TISSUE

This application claims priority from Japanese Patent Application No. 2008-182939, filed on Jul. 14, 2008, the entire contents of which are hereby incorporated by reference.

BACKGROUND OF THE INVENTION

1. Technical Field

The present disclosure relates to an image processing apparatus and an image processing method. More particularly, the present disclosure relates to an image processing apparatus and an image processing method, which perform image processing in response to an operation of changing the display angle or the display part of an image visualizing tubular tissues.

2. Description of the Related Art

Computed Tomography (CT) and Magnetic Resonance Imaging (MRI), which make it possible to directly observe the internal structure of a human body, have brought about an innovation in the medical field according to the image processing technology using a computer, and medical diagnosis using the tomographic image of a living body has been widely conducted. Further, volume rendering has been used for medical diagnosis in recent years. The volume rendering enables to visualize the complicated three-dimensional structure of the inside of a human body, which is hard to understand simply from the tomographic image of the human body. For example, the volume rendering enables to directly render an image of the three-dimensional structure from three-dimensional digital data (volume data) of an object obtained by CT.

In the volume rendering, a virtual ray is applied to volume data (three-dimensional voxel space), whereby an image is projected onto a projection plane. A ray cast method is available as a kind of this operation. In the ray cast method, sampling is performed at given intervals along the ray path and the voxel value is acquired from the voxel at each sampling point. Color information and opacity are calculated from the voxel value. The voxel is a unit of a three-dimensional region of an object and the voxel value is unique and representing the characteristic of the voxel such as the density value of the voxel. The volume data are represented by a three-dimensional array of the voxels.

The ray cast method, a Maximum Intensity Projection (MIP) method, a Minimum Intensity Projection (MinIP) method, a Multi Planar Reconstruction (MPR), a Curved Planer Reconstruction (CPR) and the like are used as three-dimensional image processing in the volume rendering. Also, a 2D slice image is generally used as two-dimensional image processing.

FIG. 9 is a drawing to show an example of a cross section cut out from volume data when the MPR is used as three-dimensional image processing in the volume rendering. As shown in FIG. 9, according to the MPR, a certain cross section 11 can be cut out from a three-dimensional volume data 51 and can be displayed. FIG. 10 is an image showing the internal tissue of a human body provided by using the MPR.

FIG. 11 is a drawing to show an example of a cross-sectional curved surface along a certain path, which is cut out from volume data, when CPR (Curved MPR) is used. As shown in FIG. 11, according to the CPR, certain cross-sectional curved surfaces 52, 53, 54, 55, and 56 along a certain path 57 in the three-dimensional volume data 51 can be cut out. Further, a continuous image 50 of the cross sections can be displayed as a planar image. Accordingly, the CPR is suited to image representation of a winding organ such as a blood vessel or an intestine. For example, the image of a blood vessel 61 in volume data shown in FIG. 12 is generated based on the voxel values of the voxels on a cross-sectional curved surface 63 along the center line of the blood vessel 61. FIG. 13 is an image showing the internal tissue of a human body provided by using the CPR.

The curved surface determined by the CPR can be defined as shown in FIG. 14. Namely, the curved surface S shown in FIG. 14 is defined by a set of plural lines li with uniform direction vector (hereinafter referred to as "CPR direction vector") v passing through certain points on the curve c in volume data. A processing apparatus such as a computer displays a two-dimensional image, based on the values of the voxels on the curved surface S (hereinafter referred to as "CPR image").

In addition, the CPR direction vector v, which is one of the parameters defining the curved surface S, can be set in any desired direction. If the CPR direction vector v is changed, an organ (e.g., a blood vessel or an intestine) represented by the curve c can be observed in a multifaceted manner. Therefore, when the user changes a CPR direction vector, the processing apparatus determines a curved surface corresponding to the CPR direction vector and displays a CPR image on the determined curved surface on the display.

As the operation of changing the CPR direction vector, for example, the operation of dragging a pointer in any desired direction on the CPR image is done. If the user drags the pointer up-and-down on the CPR image as shown in FIG. 15A, the CPR direction vector is rotated about the axis orthogonal to the CPR direction vector in volume data as shown in FIG. 15B, and the processing apparatus determines a curved surface corresponding to the CPR direction vector thus rotated. If the user drags a pointer up-and-down and from side to side on the CPR image as shown in FIG. 16A, the CPR direction vector is changed in any desired direction in volume data as shown in FIG. 16B, and the processing apparatus determines a curved surface corresponding to the CPR direction vector thus changed. (see e.g., "CPR—Curved Planar Reformation" written by Armin Kanitsar et al.)

However, if the user drags the pointer up and down on the CPR image of the curved surface such that the tangent vector of the curve c is substantially equal to the CPR direction vector, there is a possibility that the CPR image may be distorted. Further, two degrees of freedom of rotation are involved in the CPR direction vector while the operation of dragging the pointer up and down is limited to only one degree of freedom as shown in FIGS. 15A and 15B. Thus, the desired CPR image may not be obtained.

As shown in FIGS. 16A and 16B, if the user can perform the operation of changing a CPR direction vector in any desired direction in a three-dimensional space in response to the operation of dragging not only up-and-down but also from side to side, this dragging operation is performed on a two-dimensional image (CPR image) and further change in the CPR direction vector responsive to this operation is made in a three-dimensional space. Therefore, it is very difficult for the user to imagine the curved surface defined by a set of plural lines of CPR direction vector after rotation passing through certain points on the same curve as before the change. Consequently, in order to obtain any desired CPR image, the user needs to repeat rotating the CPR direction vector by trial and error. Particularly, when the CPR direction vector is rotated, it is likely that the user has the false impression that the curved surface S is rotated such that the shape is maintained.

Further, the user requires a high operation capability in cases where the user drags the pointer up-and-down and from side to side repeatedly by much trial and error to restore the CPR direction vector to the former state. This is because generally commutation rules do not hold in multiplication of a matrix involved in rotation operation.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the invention to provide an image processing apparatus and an image processing method, which is improved in operability for the user to obtain any desired image of tubular tissue.

According to one or more aspects of the present invention, an image processing apparatus is provided. The image processing apparatus comprises: a center line determination section which determines a center line of a tubular tissue based on volume data containing the tubular tissue; a direction vector determination section which determines a direction vector; a curved surface determination section which determines a curved surface formed by a set of plural lines, each of the plural lines passing through a certain point on the center line and being parallel with the direction vector; a visualizing section which visualizes the tubular tissue based on the volume data on the curved surface; and a tangent vector determination section which determines a tangent vector of the center line at an attention point on the center line. The direction vector determination section rotates the direction vector such that an angle formed between the direction vector and the tangent vector is maintained, in response to an operation of changing a display angle of the tubular tissue with the attention point as a center, and the rotated direction vector will be a new direction vector. The curved surface determination section determines a new curved surface formed by a set of plural lines, each of the plural lines passing through a certain point on the center line and being parallel with the new direction vector. The visualizing section visualizes the tubular tissue based on the volume data on the new curved surface.

According to one or more aspects of the present invention, an image processing method is provided. The image processing method comprises: (a) determining a center line of a tubular tissue based on volume data containing the tubular tissue; (b) determining a direction vector; (c) determining a curved surface formed by a set of plural lines, each of the plural lines passing through a certain point on the center line and being parallel with the direction vector; (d) visualizing the tubular tissue based on the volume data on the curved surface; (e) determining a tangent vector of the center line at an attention point on the center line; (f) rotating the direction vector such that an angle formed between the direction vector and the tangent vector is maintained, in response to an operation of changing a display angle of the tubular tissue with the attention point as a center; (g) determining the rotated direction vector to be a new direction vector; (h) determining a new curved surface formed by a set of plural lines, each of the plural lines passing through a certain point on the center line and being parallel with the new direction vector; and (i) visualizing the tubular tissue based on the volume data on the new curved surface.

Other aspects of the invention will be apparent from the following description, the drawings and the claims.

BRIEF DESCRIPTION OF THE DRAWINGS

In the accompanying drawings:

FIG. 3 is a drawing to show the CPR image shown in. FIG. 2 and the direction of drag operation for rotating a CPR direction vector with a tangent vector as an axis;

DETAILED DESCRIPTION OF EXEMPLARY EMBODIMENTS OF THE INVENTION

Exemplary embodiments of the present invention are described with reference to the drawings.

Figure 1:
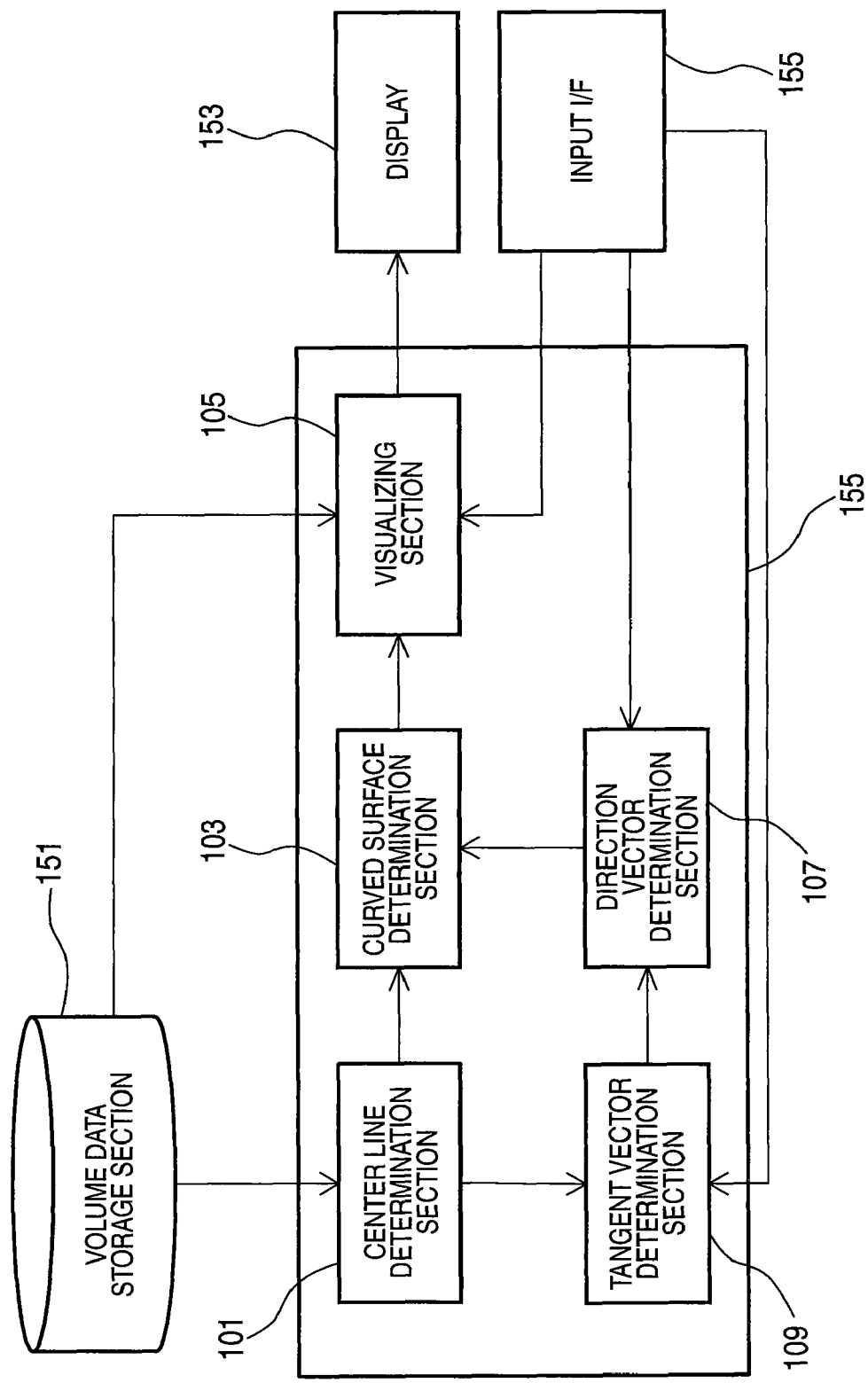
FIG. 1 is a block diagram to show the configuration of an image processing apparatus according to an exemplary embodiment of the invention and the neighbor of the image processing apparatus.

FIG. 1 is a block diagram to show the configuration of an image processing apparatus of an exemplary embodiment of the invention and the neighbor of the image processing apparatus. The image processing apparatus 100 shown in FIG. 1 performs image processing by Curved Planer Reconstruction (CPR). The image processing apparatus 100 includes a center line determination section 101, a curved surface determination section 103, a visualizing section 105, a direction vector determination section 107, and a tangent vector determination section 109. The respective components of the image processing apparatus 100 operate as a processor such as a computer executes a program.

A volume data storage section 151 is connected to the center line determination section 101. The volume data storage section 151 stores volume data containing tubular tissue. A display 153 is connected to the visualizing section 105. The display 153 presents a CPR image of tubular tissues visualized by the visualizing section 105. An input interface (input I/F) 155 is connected to the direction vector determination section 107 and the tangent vector determination section 109. The input I/F 155 accepts the operation of the user to change the display angle and the display part of tubular tissues on a CPR image on the display 153.

The center line determination section 101 determines the center line of the tubular tissue existing in the volume data based on the volume data provided by the volume data storage section 151. The direction vector determination section 107 determines a CPR direction vector based on input of the user. The curved surface determination section 103 determines a curved surface based on a set of plural lines that are parallel with the CPR direction vector passing through a certain point on a certain center line determined by the center line determination section 101. The tubular tissue in the volume data is three-dimensionally bent. Accordingly, the shape of the curved surface determined by the curved surface determination section 103 varies depending on the CPR direction vector of the line forming the curved surface.

Figure 2:
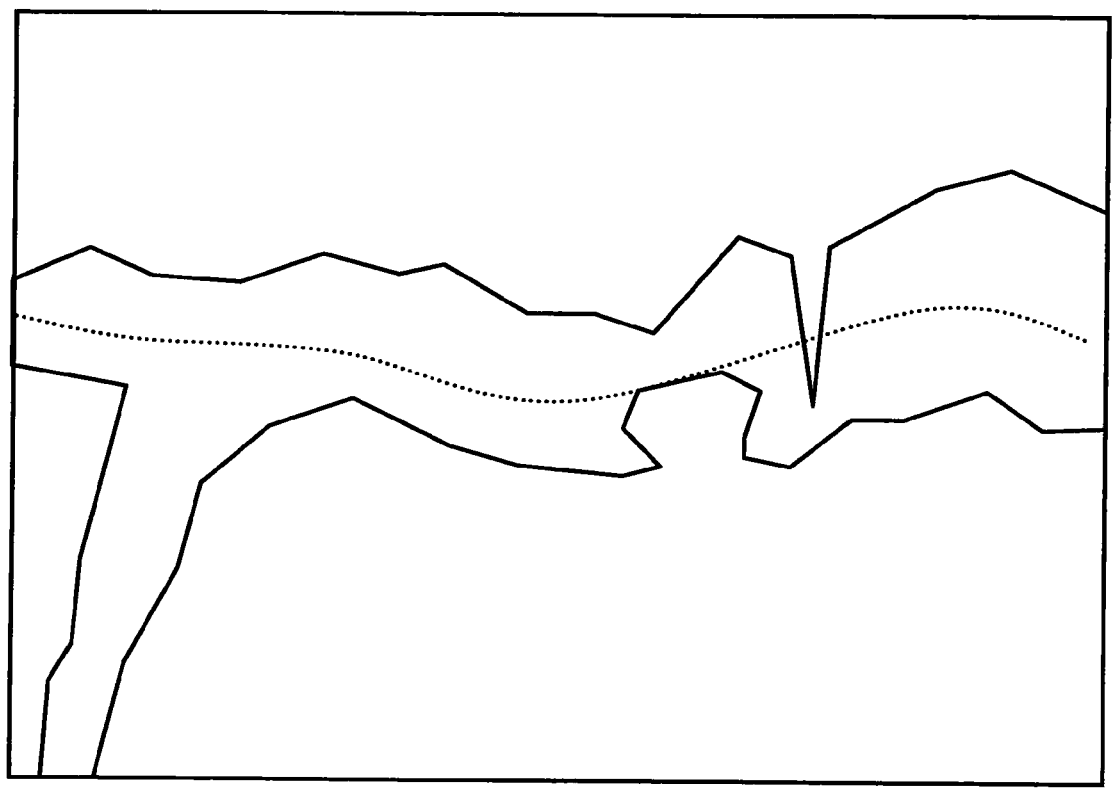
FIG. 2 is a drawing to show an example of a CPR image on a display.

The visualizing section 105 acquires the values of the voxels on the curved surface determined by the curved surface determination section 103 from the volume data storage section 151. Then, the visualizing section 105 performs image processing so that the cross-sectional curved surface containing the tubular tissue on the curved surface can be visualized as a two-dimensional image. The data provided by the visualizing section 105 is sent to the display 153, and then the display 153 shows a CPR image. FIG. 2 is a drawing to show an example of the CPR image on the display 153.

The tangent vector determination section 109 determines the tangent vector of the center line at an attention point on the center line of the tubular tissue in the CPR image on the display 153. The attention point is set by the user. Setting of the attention point is accepted by the input I/F 155 and data containing the attention point are sent to the tangent vector determination section 109. Also, instead of the input I/F 155 that accepts the attention point, an attention point determination section that determines the attention point may be provided.

In the exemplary embodiment, after the attention point is set, if the user drags a pointer in a roughly longitudinal direction or a roughly lateral direction on the CPR image, the curved surface determination section 103 operates as described below. The operation of the curved surface determination section 103, when the user drags the pointer in the roughly longitudinal direction and, when the user drags the pointer in the roughly lateral direction, is discussed.

(The Drag Operation in the Roughly Longitudinal Direction)

After the user sets the attention point, if the user drags the pointer in the roughly longitudinal direction on the CPR image, the operation is accepted by the input I/F 155 and the data containing the drag operation are sent to the direction vector determination section 107. At this time, while maintaining the angle formed between the CPR direction vector and the tangent vector of the center line at the attention point, the direction vector determination section 107 determines a new CPR direction vector rotated about the tangent vector. The curved surface determination section 103 determines a curved surface based on a set of plural lines passing through a certain point containing the attention point on the center line and parallel with the direction vector. The visualizing section 105 displays the CPR image of the tubular tissue on the curve.

Figure 3:
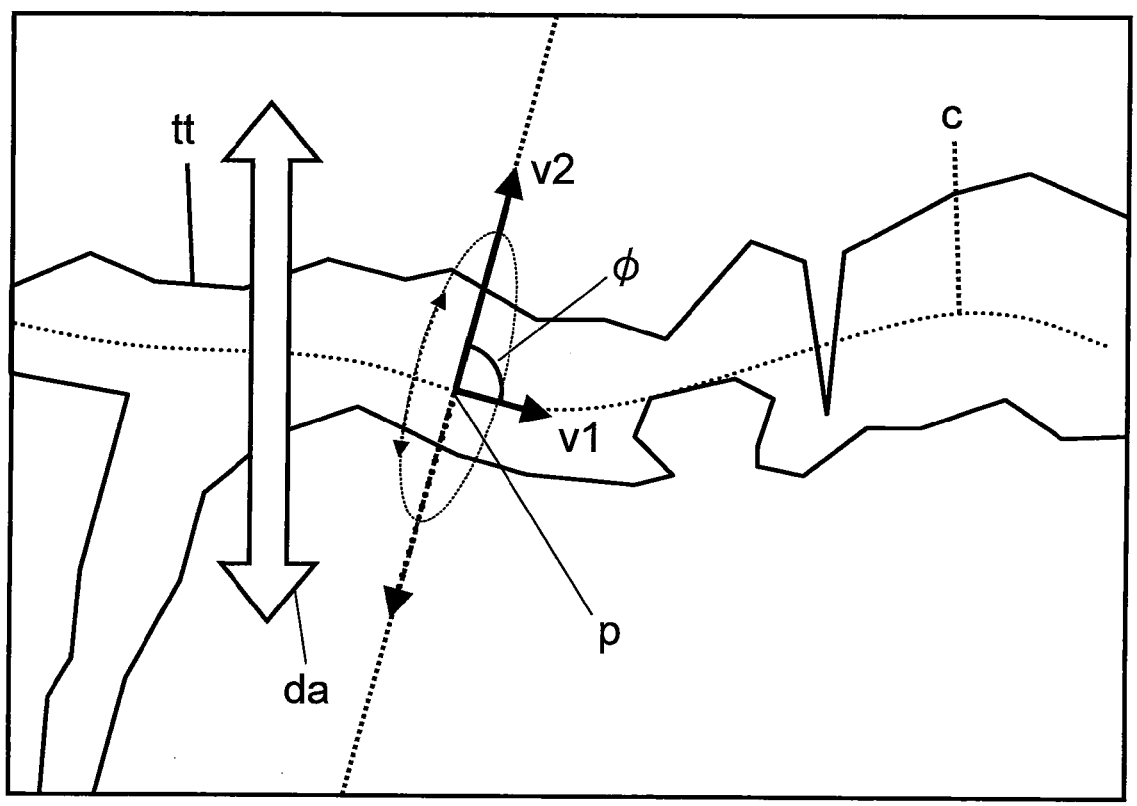
Figure 5:
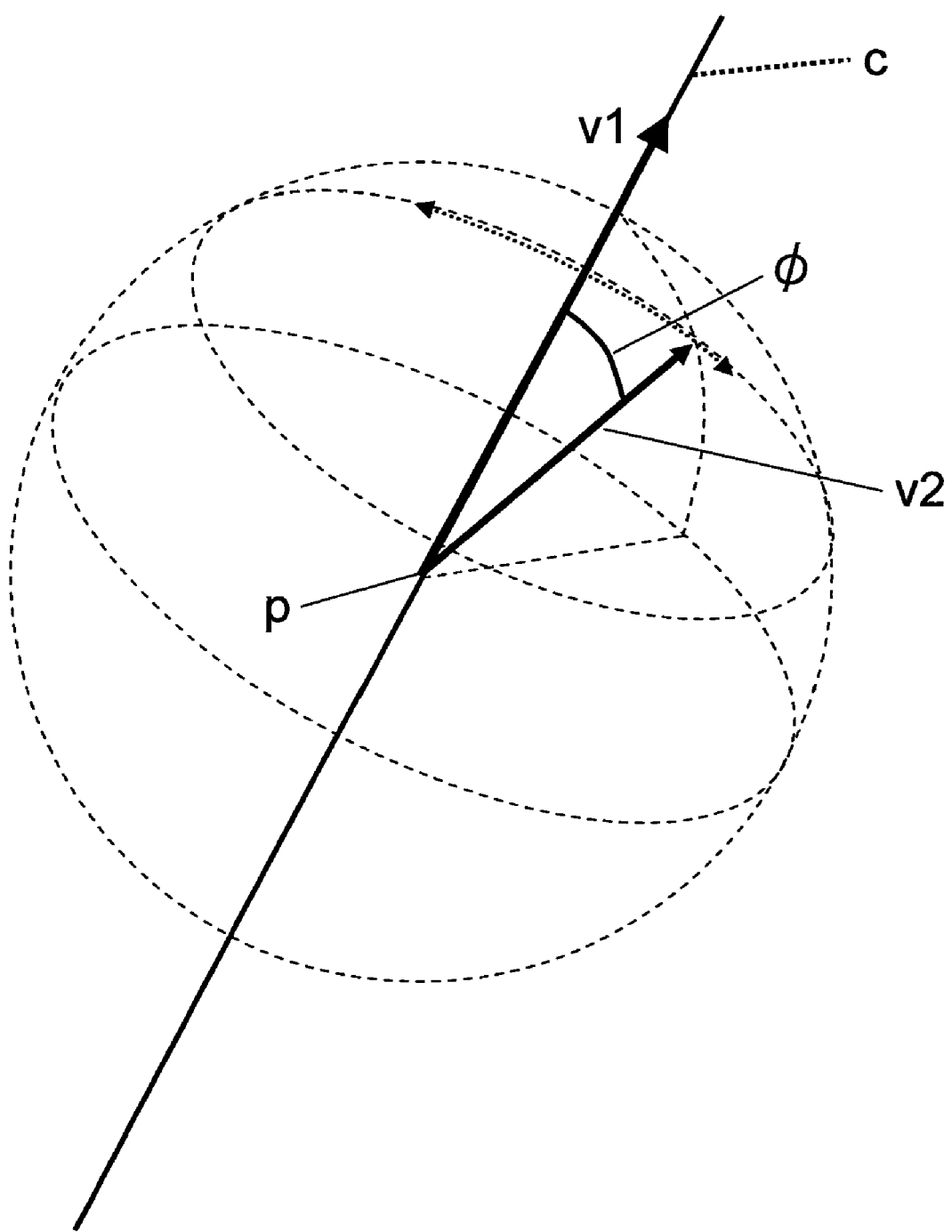
FIG. 5 is a drawing to describe the operation shown in FIG. 3 or 4 in a three-dimensional space.

FIG. 3 is a drawing to show the CPR image shown in FIG. 2 and the direction of drag operation for rotating a CPR direction vector with respect to a tangent vector. As shown in FIG. 3, in order to rotate a CPR direction vector v2 with respect to a tangent vector v1 of a center line c at an attention point p on the center line c of tubular tissue tt in the CPR image, the user drags the pointer in an arrow da direction shown in FIG. 3 on the CPR image. If the drag operation is performed, angle Φ of the CPR direction vector v2 with respect to the tangent vector v1 does not change. This is because the CPR direction vector v2 rotates with the tangent vector as an axis. FIG. 5 illustrates the operation in a three-dimensional space.

Figure 4:
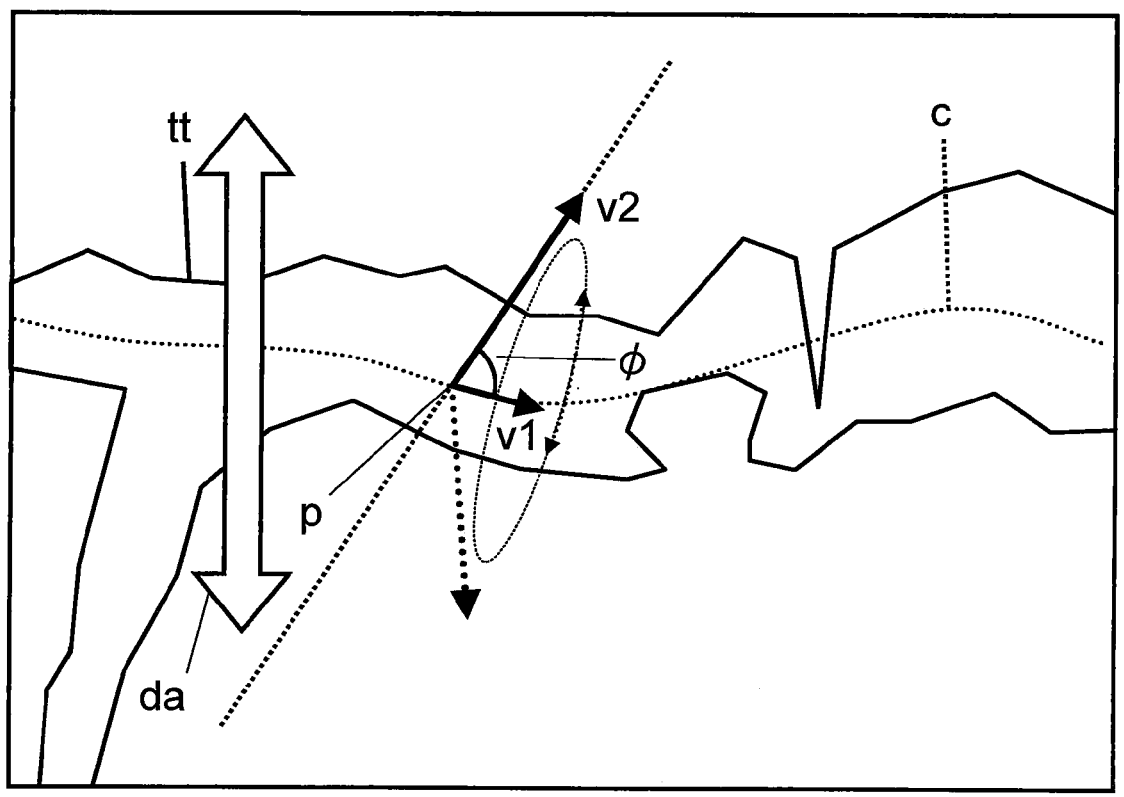
FIG. 4 is a drawing to show the CPR image shown in FIG. 2 and the direction of drag operation for rotating a CPR direction vector with a tangent vector as an axis.

As shown in FIG. 4, the angle Φ of the CPR direction vector v2 with respect to the tangent vector v1 is arbitrary. Thus, the angle Φ with respect to the tangent vector v1 is determined according to the initial CPR direction vector v2 when the user sets the attention point p, and the angle Φ may be almost 90 degrees as shown in FIG. 3. The user may determine the initial CPR direction vector v2 as desired or an application may give an appropriate initial value.

(The Drag Operation in the Roughly Lateral Direction)

After the user sets the attention point, if the user drags the pointer in the roughly lateral direction on the CPR image, the operation is accepted by the input I/F 155 and the data containing the drag operation are sent to the direction vector determination section 107. At this time, the direction vector determination section 107 changes the angle formed between the CPR direction vector and the tangent vector of the center line at the attention point, and then determines a new CPR direction vector. The curved surface determination section 103 determines a curved surface based on a set of plural lines passing through a certain point containing the attention point on the center line and parallel with the direction vector. The visualizing section 105 displays the CPR image of the tubular tissue on the curved surface.

Figure 6:
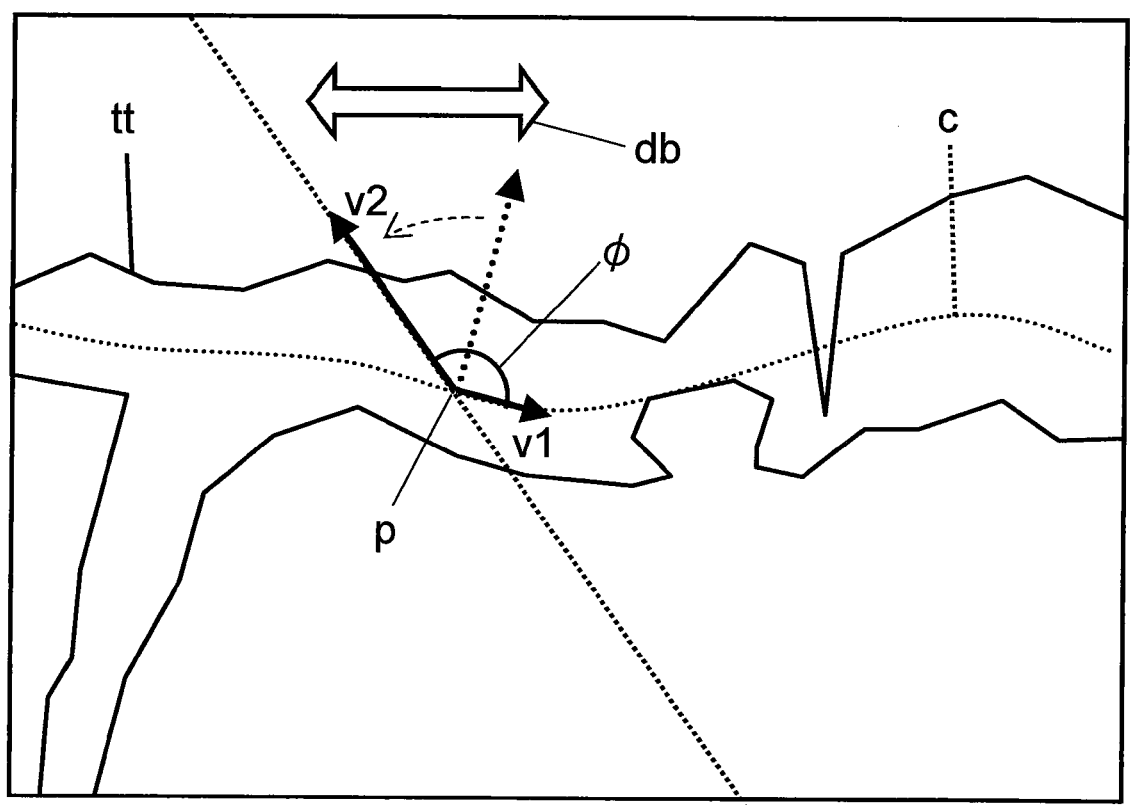
FIG. 6 is a drawing to show the CPR image shown in FIG. 2 and the direction of drag operation for changing the angle of a CPR direction vector with respect to a tangent vector of a center line at an attention point.
Figure 7:
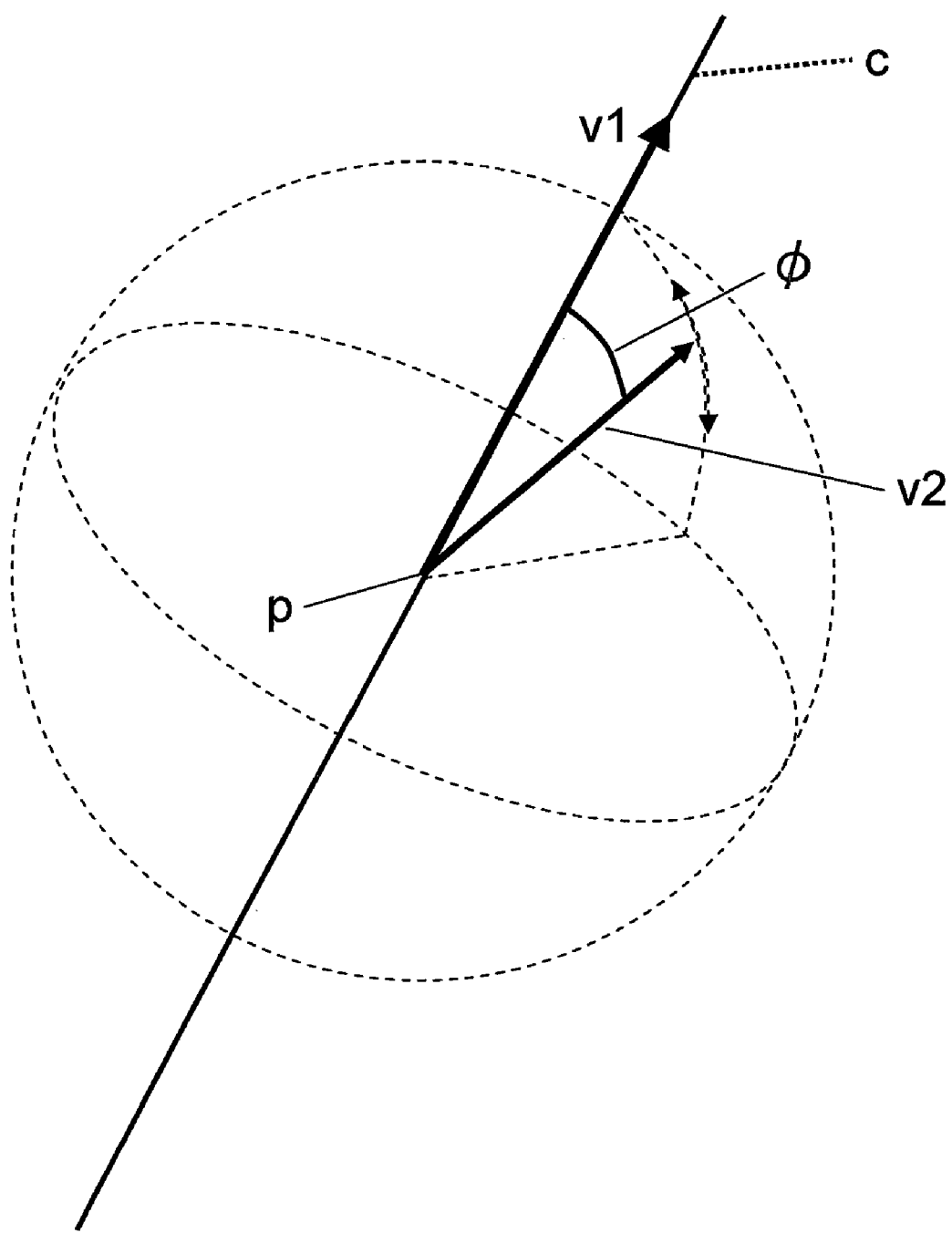
FIG. 7 is a drawing to describe the operation shown in FIG. 6 in a three-dimensional space.

FIG. 6 is a drawing to show the CPR image shown in FIG. 2 and the direction of drag operation for changing the angle formed between the CPR direction vector and the tangent vector of the center line at the attention point. As shown in FIG. 6, in order to change the angle Φ formed between the CPR direction vector v2 and the tangent vector v1 of the center line c at the attention point p on the center line c of tubular tissue tt in the CPR image, the user drags the pointer in an arrow db direction shown in FIG. 6 on the CPR image. At this time, the new CPR direction vector v2 rotates about the attention point p on the plane formed by the tangent vector v1 and the CPR direction vector v2. FIG. 7 illustrates the operation in a three-dimensional space.

Figure 8:
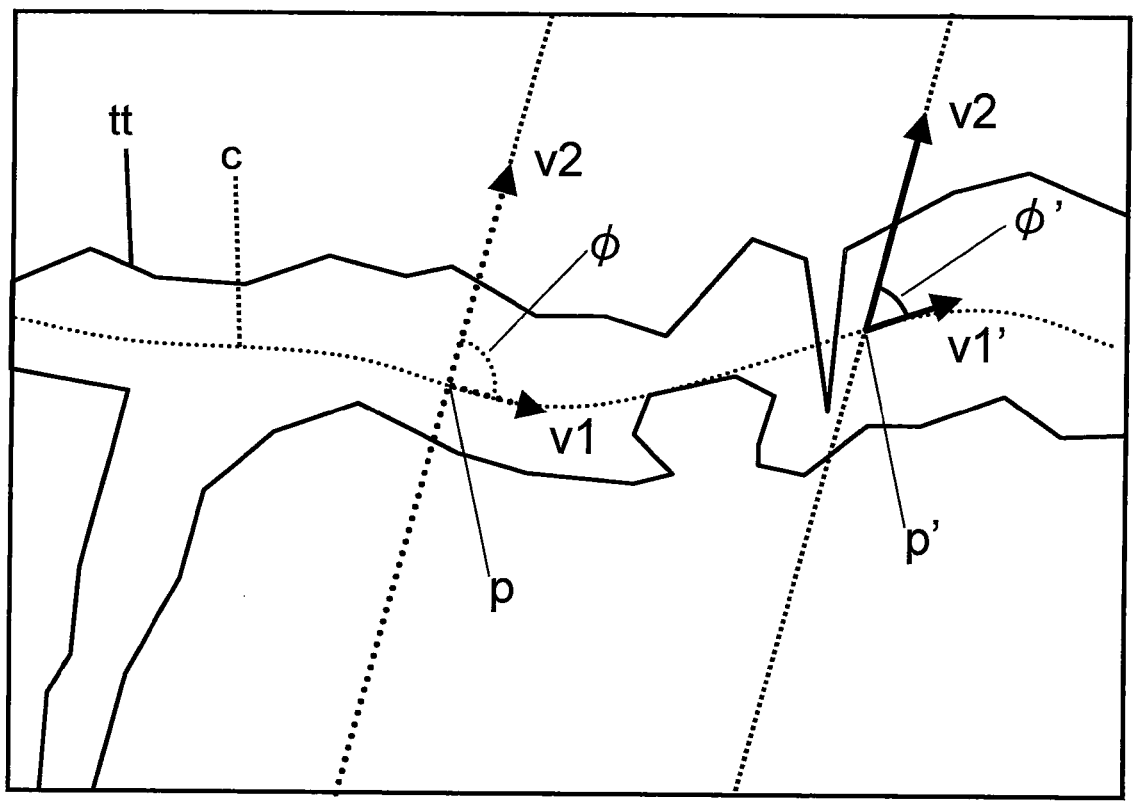
FIG. 8 is a drawing to show a tangent vector and a CPR direction vector when an attention point is changed on the CPR image shown in FIG. 2.
Figure 9:
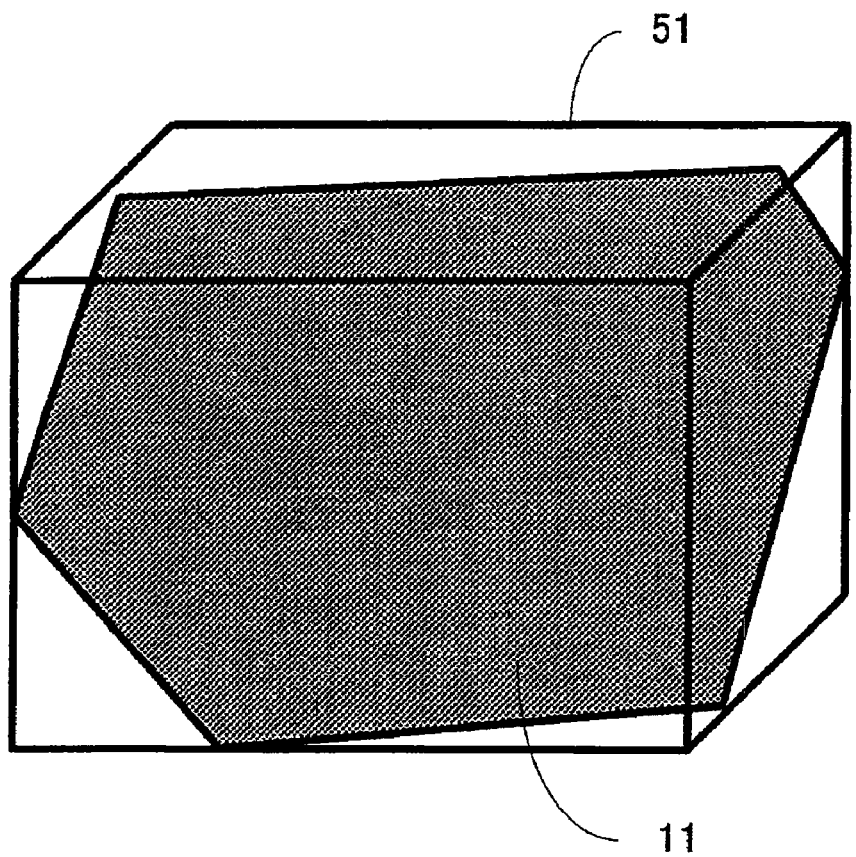
FIG. 9 is a drawing to show an example of a cross section cut out from volume data when MPR is used.
Figure 10:
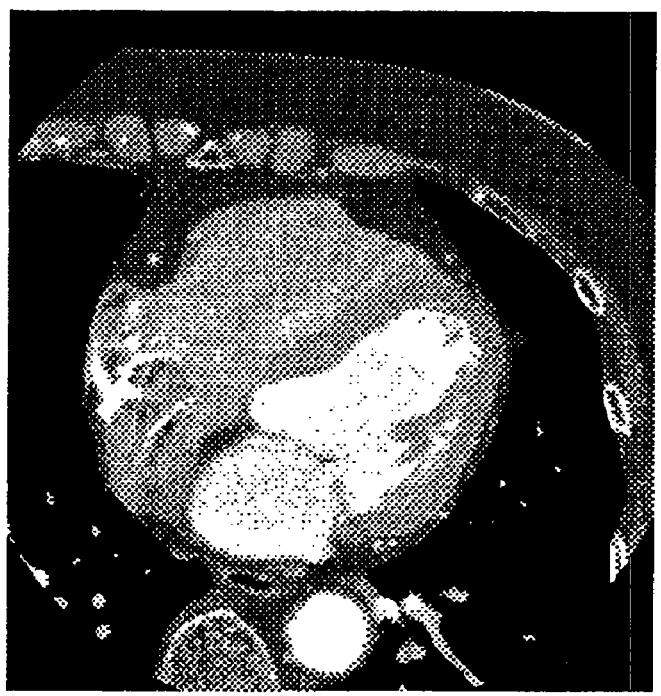
FIG. 10 is an image showing the internal tissue of a human body provided by using MPR.
Figure 11:
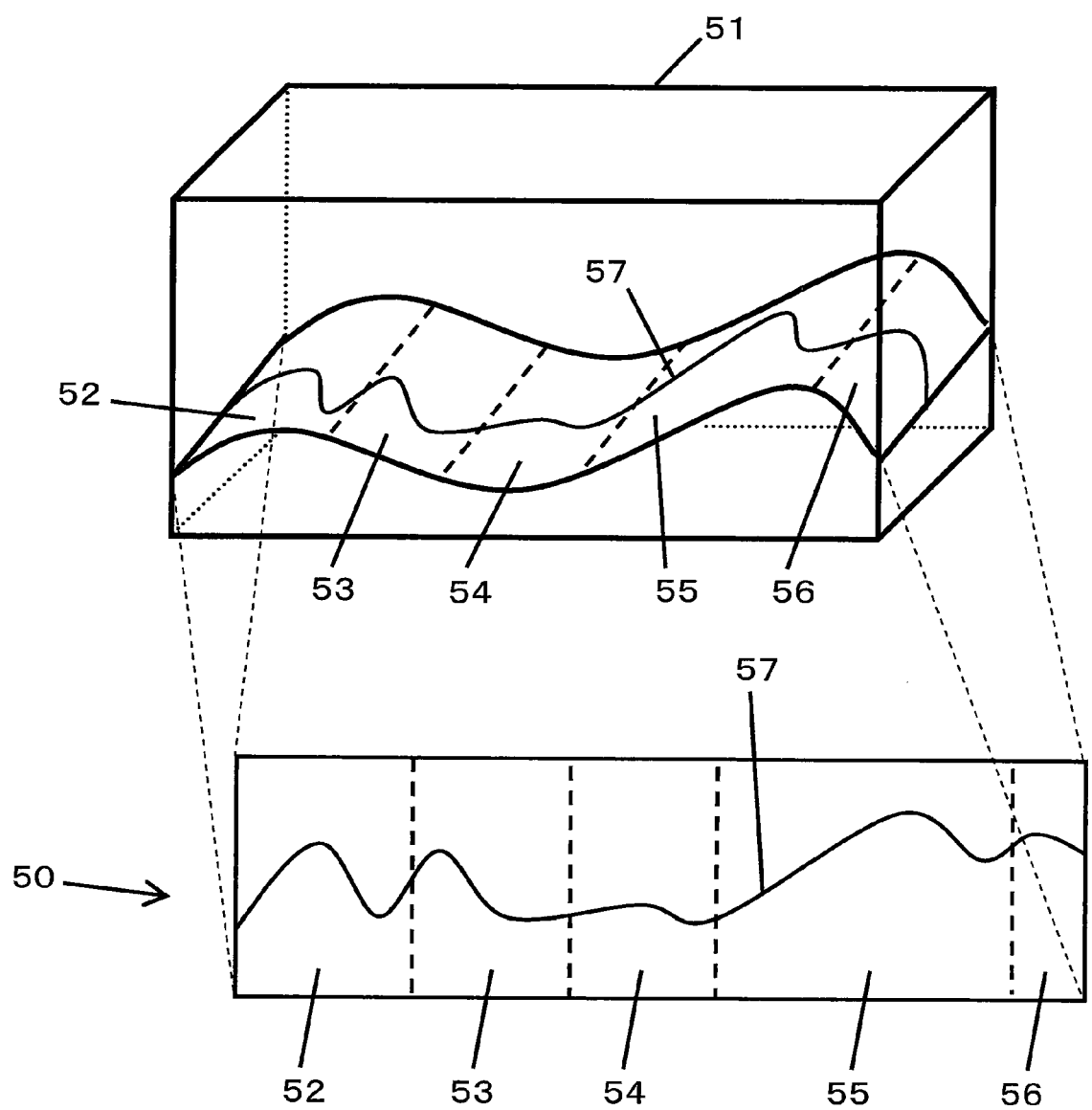
FIG. 11 is a drawing to show an example of a cross-sectional curved surface along a certain path cut out from volume data when CPR is used.
Figure 12:
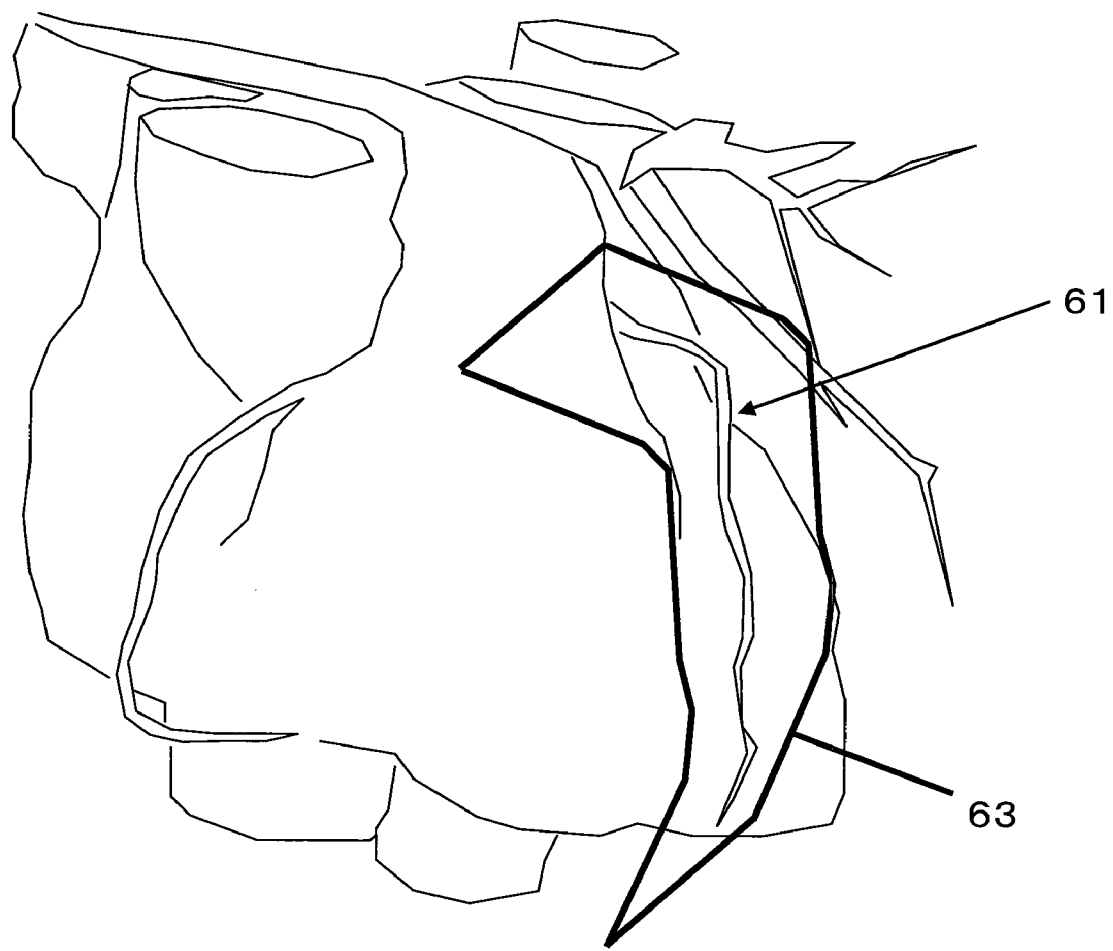
FIG. 12 is a drawing to show an organ and a blood vessel in volume data and a cross-sectional curved surface along the center line of the blood vessel.
Figure 13:
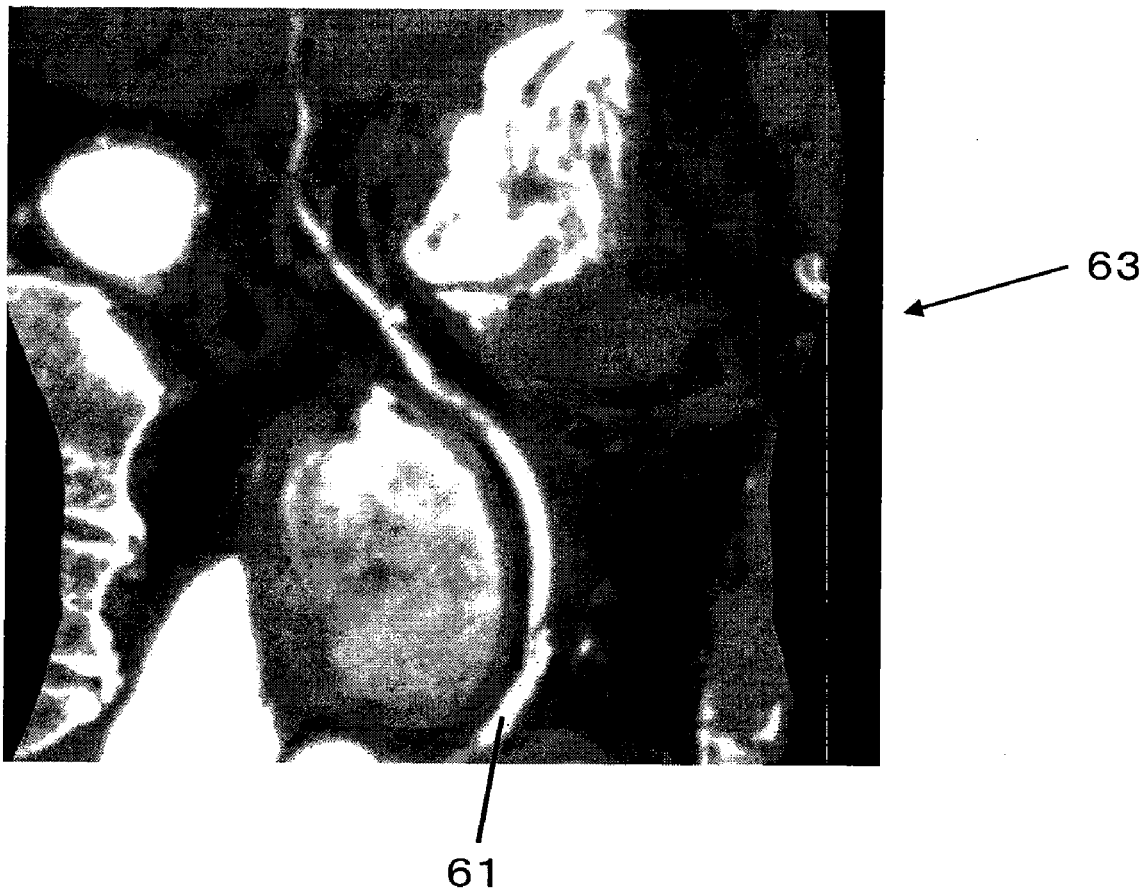
FIG. 13 is an image showing the internal tissue of a human body provided by using CPR.
Figure 14:
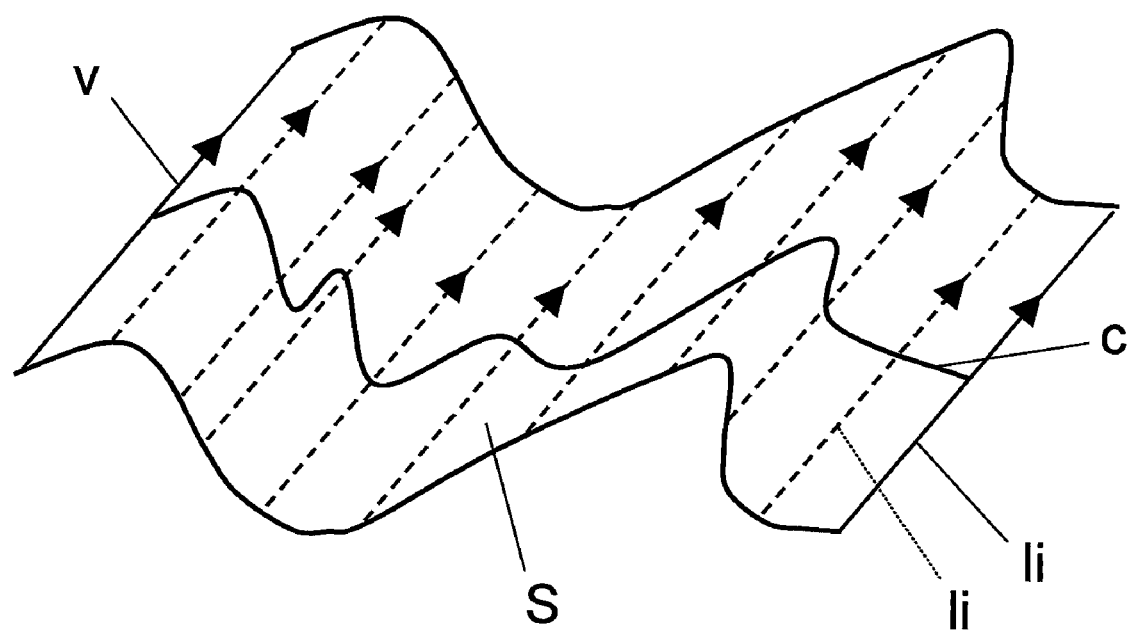
FIG. 14 is a drawing to show a curved surface determined by CPR.
Figure 15A:
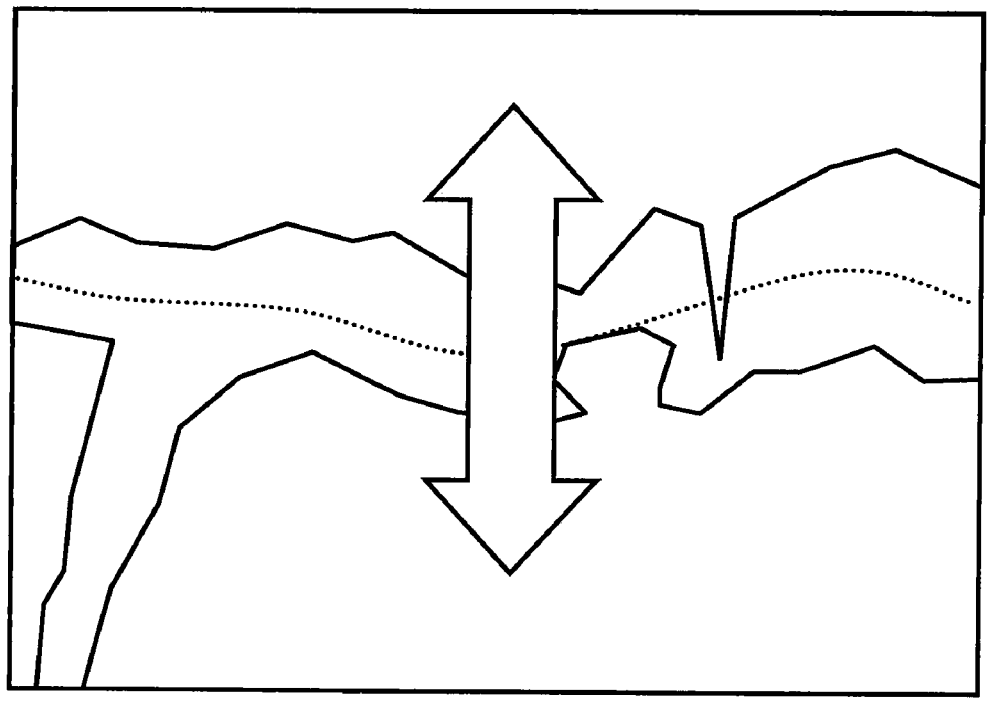
FIG. 15A is a drawing to show the operation of dragging up and down on a CPR image.
Figure 15B:
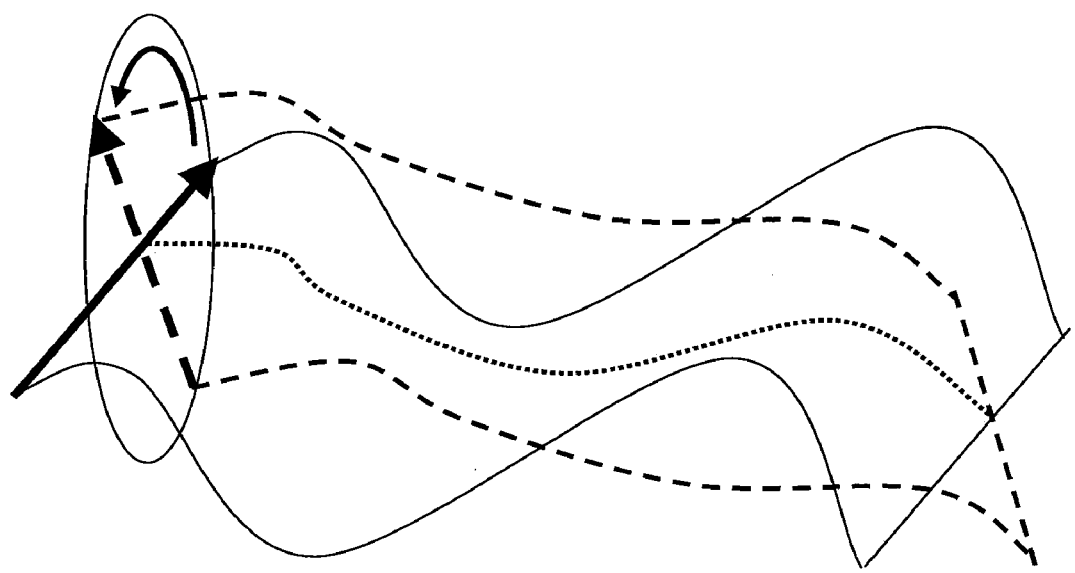
FIG. 15B is a drawing to show change in a curved surface responsive to change in a CPR direction vector.
Figure 16A:
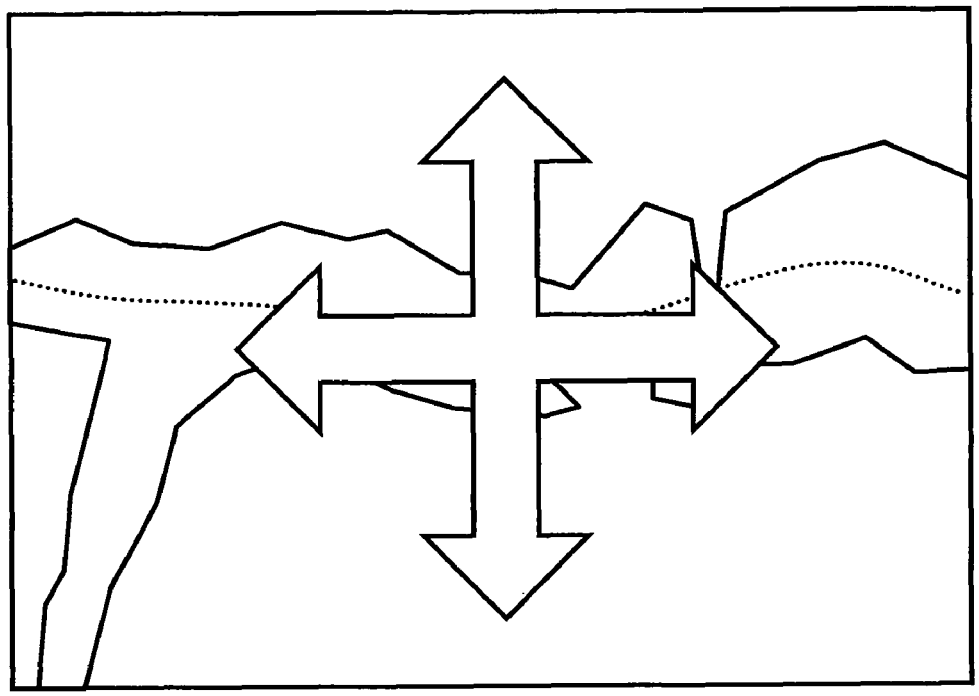
FIG. 16A is a drawing to show the operation of dragging a pointer up-and-down and from side to side on a CPR image.
Figure 16B:
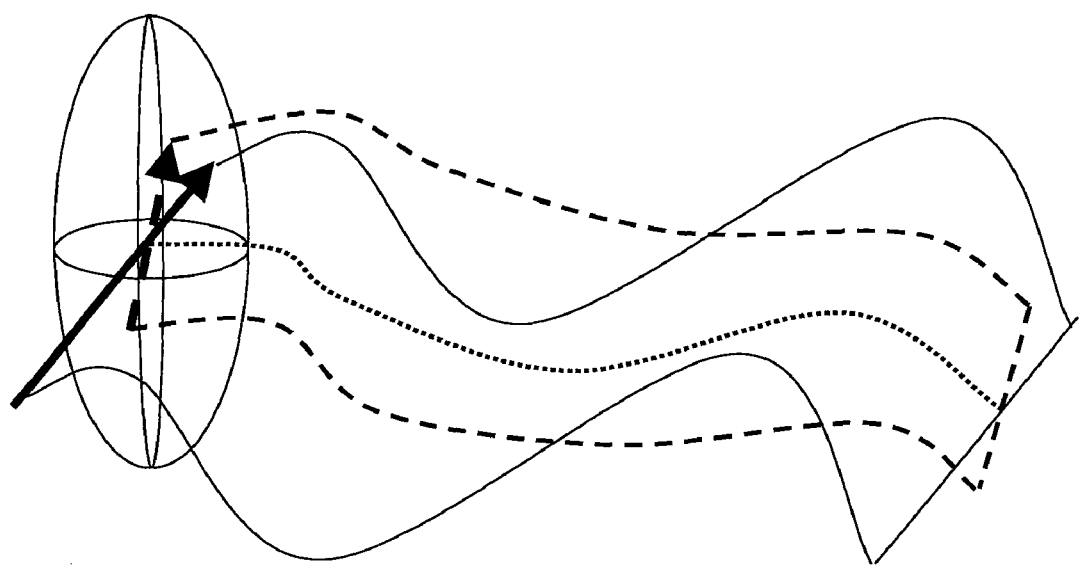
FIG. 16B is a drawing to show change in a curved surface responsive to change in CPR direction vector.

In the exemplary embodiment, when the attention point is set, if the user selects another point on the same center line on the CPR image to change the position of the attention point, the direction vector determination section 107 and the curved surface determination section 103 operate as described below. FIG. 8 is a drawing to show a tangent vector and a CPR direction vector when an attention point is changed on the CPR image shown in FIG. 2. As shown in FIG. 8, the tangent vector determination section 109 recognizes the point selected by the user as another attention point p' and then determines a tangent vector v1' of the center line c at the attention point p'.

In the exemplary embodiment, as shown in FIG. 8, the CPR direction vector relative to the tangent vector v1' of the center line c at the attention point p' after change is set so as to become the same as the CPR direction vector v2 relative to the tangent vector v1 of the center line c at the attention point p before change. Therefore, the curved surface determined by the curved surface determination section 103 after change of the position of the attention point is the same as the curved surface before change. However, since the tangent vector v1 and the angle Φ change, the result when the CPR direction vector v2 is rotated about the tangent vector v1 varies before and after change of the attention point p. Accordingly, although it is made possible to perform operation of rotating the CPR direction vector with its corresponding tangent vector as an axis in response to the changed attention point, the curved surface determined by the curved surface determination section 103 after change of the position of the attention point is the same as the curved surface before change. Accordingly, the user can continue the operation seamlessly.

As described above, according to the image processing apparatus 100 of the exemplary embodiment, the attention point is set on the center line of tubular tissue in the CPR image on the display 153. Then, if the user drags the pointer in the roughly longitudinal direction on the CPR image such that the angle with respect to the tangent vector is maintained, the CPR direction vector rotates about the tangent vector responsive to the attention point. As described above, the curved surface determination section 103 determines a curved surface based on a set of plural lines parallel with the CPR direction vector passing through an arbitrary point on the center line. If the angle formed between the CPR direction vector and the tangent vector is changed, a CPR image in a different direction from the direction obtained from rotating about the tangent vector can be generated.

Therefore, while the user adjusts the angle formed between CPR direction vector and the tangent vector with one attention point as the center, if the user rotates the CPR direction vector about the tangent vector, the user can observe the tubular tissue of the attention point from all directions while always paying attention to the attention point in the CPR image. At this time, the user performs two types of drag operation on the CPR image, i.e., one is a drag operation in the roughly longitudinal direction and the other is a drag operation in the roughly lateral direction. Thus, the user does not require a high operation capability to obtain any desired CPR image. Because of rotation about the attention point, the image can be easily restored to the CPR image before subjected to more than one operation.

Further, if the position of the attention point is changed on the same center line, the CPR direction vector at the changed attention point is set so as to become the same as the CPR direction vector at the attention point before change. Thus, the curved surface determined by the curved surface determination section 103 after change of the position of the attention point is the same as the curved surface before change. Consequently, if the position of the attention point is changed, the user can continue the operation seamlessly.

The center line of the tubular tissue can be set manually by the user or can be set by known search algorithm (see e.g., U.S. Patent Application Pub. 2004/0220466). Also, it is advantageous that the center line should be an appropriately smooth curve conforming to intuition of the user. This is because it becomes hard for the user to keep track of the tissue when the center line meanders finely in accordance with a stenosis or an aneurysm if the tubular tissue contains the stenosis or the aneurysm.

In the exemplary embodiment, the blood vessel is used as an example of the tubular tissue, but the exemplary embodiment can be applied not only to the blood vessel, but also to digestive organs, trachea, an intestine, a bile duct, and any other tissue.

In the exemplary embodiment, the curved surface has been described as a surface having no thickness, but may be provided with thickness. MIP method, average value method or the like can be used as means for visualizing volume data contained in a curved surface having a thickness.

In the exemplary embodiment, the operation of rotating the CPR direction vector about the tangent vector is accepted by drag operation in the roughly longitudinal direction, and the operation of changing the angle formed between the tangent vector and the CPR direction vector is accepted by drag operation in the roughly lateral direction. However, the operation may be accepted by any desired operation of a handle, a slider or the like on a GUI or any desired input device such as a keyboard or a joy stick may be used.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. An image processing apparatus, comprising:
   a center line determination section which determines a center line of a tubular tissue based on volume data containing the tubular tissue;
   a direction vector determination section which determines a direction vector;
   a curved surface determination section which determines a curved surface formed by a set of plural lines, each of the plural lines passing through an arbitrary point on the center line and being parallel with the direction vector;
   a visualizing section which visualizes the tubular tissue based on the volume data on the curved surface; and
   a tangent vector determination section which determines a tangent vector of the center line at a set point on the center line, wherein the direction vector determination section rotates the direction vector such that an angle formed between the direction vector and the tangent vector is maintained, in response to an operation of changing a display angle of the tubular tissue with the set point as a center, and the rotated direction vector will be a new direction vector, wherein the curved surface determination section determines a new curved surface formed by a set of plural lines, each of the plural lines passing through an arbitrary point on the center line and being parallel with the new direction vector, and wherein the visualizing section visualizes the tubular tissue based on the volume data on the new curved surface.

2. The image processing apparatus as claimed in claim 1, wherein, in response to an operation of changing the angle formed between the direction vector and the tangent vector, the direction vector determination section rotates the direction vector about the set point on a plane formed by the tangent vector and the direction vector, and then the rotated direction vector will be a new direction vector.

3. The image processing apparatus as claimed in claim 1, wherein the tangent vector determination section determines a new tangent vector in response to an operation of changing the position of the set point on the center line.

4. An image processing method, comprising:
   (a) determining a center line of a tubular tissue based on volume data containing the tubular tissue;

(b) determining a direction vector;
(c) determining a curved surface formed by a set of plural lines, each of the plural lines passing through an arbitrary point on the center line and being parallel with the direction vector;
(d) visualizing the tubular tissue based on the volume data on the curved surface;
(e) determining a tangent vector of the center line at a set point on the center line;
(f) rotating the direction vector such that an angle formed between the direction vector and the tangent vector is maintained, in response to an operation of changing a display angle of the tubular tissue with the set point as a center;
(g) determining the rotated direction vector to be a new direction vector;
(h) determining a new curved surface formed by a set of plural lines, each of the plural lines passing through an arbitrary point on the center line and being parallel with the new direction vector; and
(i) visualizing the tubular tissue based on the volume data on the new curved surface.

5. The image processing method as claimed in claim 4, further comprising:
(j) rotating the direction vector about the set point on a plane formed by the tangent vector and the direction vector, in response to an operation of changing the angle formed between the direction vector and the tangent vector.

6. The image processing method as claimed in claim 4, further comprising:
(k) determining a new tangent vector in response to an operation of changing the position of the set point on the center line.

* * * * *